(12) United States Patent
Marusawa et al.

(10) Patent No.: US 10,832,878 B2
(45) Date of Patent: Nov. 10, 2020

(54) ROTARY ENCODER

(71) Applicant: Murata Manufacturing Co., Ltd., Nagaokakyo (JP)

(72) Inventors: Hiroshi Marusawa, Nagaokakyo (JP); Yoshiaki Nomura, Nagaokakyo (JP); Hiroyuki Kishishita, Nagaokakyo (JP); Masakazu Murata, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/382,241

(22) Filed: Apr. 12, 2019

(65) Prior Publication Data

US 2019/0237280 A1    Aug. 1, 2019

Related U.S. Application Data

(63) Continuation of application No. PCT/JP2017/034558, filed on Sep. 25, 2017.

(30) Foreign Application Priority Data

Oct. 18, 2016    (JP) .................................. 2016-204468

(51) Int. Cl.
*H01H 19/58* (2006.01)
*H01H 25/06* (2006.01)
(Continued)

(52) U.S. Cl.
CPC ............... *H01H 19/58* (2013.01); *G01D 5/16* (2013.01); *G01D 5/251* (2013.01); *H01H 11/04* (2013.01);
(Continued)

(58) Field of Classification Search
CPC ........ H01H 19/58; H01H 11/04; H01H 19/08; H01H 25/06; H01H 11/06;
(Continued)

(56) References Cited

U.S. PATENT DOCUMENTS

2004/0041086 A1    3/2004 Imamura
2005/0112278 A1*  5/2005 Obata .................. G03G 5/0525
                                                            427/231

FOREIGN PATENT DOCUMENTS

JP    56-161514 U    12/1981
JP    01-258328 A    10/1989
(Continued)

OTHER PUBLICATIONS

Official Communication issued in International Patent Application No. PCT/JP2017/034558, dated Dec. 5, 2017.
(Continued)

*Primary Examiner* — Tony Ko
(74) *Attorney, Agent, or Firm* — Keating & Bennett, LLP

(57) ABSTRACT

A rotary encoder includes a shaft and an encoder mechanism that holds the shaft in a rotatably inserted state and detects a rotation direction and a rotation angle of the shaft. The encoder mechanism includes a substrate that rotatably holds the shaft, an insulator portion and a resistor portion provided on one surface of the substrate and alternately provided in the rotation direction of the shaft, a rotor attached to the shaft so as to be integrally rotatable with the shaft, and a slider that is attached to the rotor and alternately slidably contacts the insulator portion and the resistor portion by rotation of the shaft. The insulator portion includes a base material made of a resin, spherical silica, and a fluororesin filler.

19 Claims, 12 Drawing Sheets

(51) Int. Cl.
    *G01D 5/16*           (2006.01)
    *G01D 5/251*         (2006.01)
    *H01H 11/06*         (2006.01)
    *H01H 11/04*         (2006.01)
    *H01H 19/08*         (2006.01)

(52) U.S. Cl.
    CPC ............ *H01H 11/06* (2013.01); *H01H 19/08* (2013.01); *H01H 25/06* (2013.01)

(58) Field of Classification Search
    CPC .... H01H 2300/036; H01H 19/11; G01D 5/16; G01D 5/251; G01D 5/252; G01D 5/24442
    See application file for complete search history.

(56) References Cited

FOREIGN PATENT DOCUMENTS

| | | |
|---|---|---|
| JP | 08-199116 A | 8/1996 |
| JP | 2004-095242 A | 3/2004 |
| JP | 2007-192386 A | 8/2007 |
| WO | 2015/111574 A1 | 7/2015 |
| WO | 2016/157981 A1 | 10/2016 |

OTHER PUBLICATIONS

Official Communication issued in corresponding Japanese Patent Application No. 2018-546210, dated Aug. 4, 2020.

\* cited by examiner

ROTARY ENCODER

CROSS REFERENCE TO RELATED APPLICATIONS

This application claims the benefit of priority to Japanese Patent Application No. 2016-204468 filed on Oct. 18, 2016 and is a Continuation Application of PCT Application No. PCT/JP2017/034558 filed on Sep. 25, 2017. The entire contents of each application are hereby incorporated herein by reference.

BACKGROUND OF THE INVENTION

1. Field of the Invention

The present invention relates to a rotary encoder.

2. Description of the Related Art

Japanese Patent Application Laid-Open No. 1-258328 describes a conventional rotary encoder. The rotary encoder disclosed in Japanese Patent Application Laid-Open No. 1-258328 includes a shaft, an insulating substrate constituted of a resin, an electrode pattern intermittently formed on one surface of the insulating substrate in a rotation direction of the shaft, and a metallic slider that is configured to be rotatable with the shaft and to alternately slidably contact the insulating substrate and the electrode pattern by rotation of the shaft.

The conventional rotary encoder has a problem that since the insulating substrate is constituted of a resin, hardness of the insulating substrate becomes lower than hardness of the slider, and when the slider slides on the insulating substrate, the insulating substrate wears.

SUMMARY OF THE INVENTION

Preferred embodiments of the present invention provide rotary encoders that are each capable of reducing wear of an insulating substrate.

A rotary encoder according to a preferred embodiment of the present invention includes a shaft; and an encoder mechanism that holds the shaft in a rotatably inserted state and detects a rotation direction and a rotation angle of the shaft. The encoder mechanism includes a substrate that rotatably holds the shaft; an insulator portion and resistor portions provided on one surface of the substrate and alternately provided in the rotation direction of the shaft; a rotor attached to the shaft to be integrally rotatable with the shaft; and a slider that is attached to the rotor and alternately contacts the insulator portion and the resistor portion in a sliding manner by rotation of the shaft. The insulator portion includes a base material made of a resin, spherical silica, and a fluororesin filler.

In a rotary encoder according to a preferred embodiment of the present invention, when the slider slides on the insulator portion, wear of the insulator portion is able to be reduced due to high hardness of the spherical silica included in the insulator portion. Further, sliding of the slider on one surface on which the slider of the insulator portion slides is good and a friction coefficient is reduced by the fluororesin filler of the insulator portion due to a shape of the spherical silica of the insulator portion having no sharp point, and consequently, wear of the slider is able to be reduced. Therefore, it is possible to reduce both wear of the insulating substrate and wear of the slider with preferred embodiments of the present invention.

In a rotary encoder according to a preferred embodiment of the present invention, the average particle diameter of the spherical silica is about 0.4 µm or more and about 0.8 µm or less.

In the present disclosure, the average particle diameter is the particle diameter (D50) at the point at which a cumulative value becomes about 50% in a cumulative curve generated by obtaining a particle size distribution determined based on a volume and setting a total volume as 100%. Such an average particle diameter is able to be measured using a laser diffraction/scattering particle diameter/particle size distribution measuring device or an electron scanning microscope.

In a rotary encoder according to a preferred embodiment of the present invention, since the average particle diameter of the spherical silica is small, surface irregularities of the insulator portion are able to be reduced or prevented, and the difference in height between a surface of the insulator portion and a surface of the resistor portion is able to be reduced. Thus, it is possible to improve contact failure in which the slider contacts the insulator portion but does not contact the resistor portion.

In a rotary encoder according to a preferred embodiment of the present invention, a content ratio of the spherical silica included in the insulator portion is about 5 vol % or more and about 50 vol % or less, a content ratio of the fluororesin filler included in the insulator portion is about 1 vol % or more and about 20 vol % or less, and a sum of the content ratio of the spherical silica and the content ratio of the fluororesin filler is about 50 vol % or less.

With the rotary encoder of the above-described preferred embodiment, it is possible to effectively achieve a reduction in both wear of the insulator portion and wear of the slider.

In a rotary encoder according to a preferred embodiment of the present invention, the average particle diameter of the fluororesin filler is about 50 nm or more and about 800 nm or less.

In the rotary encoder of the above-described preferred embodiment, since the average particle diameter of the fluororesin filler is small, the fluororesin filler is able to be unevenly distributed on a surface side at which the fluororesin filler contacts the slider of the insulator portion. This makes it possible to reduce the friction coefficient of the surface of the insulator portion and effectively reduce wear of the slider.

In a rotary encoder according to a preferred embodiment, the fluororesin filler is polytetrafluoroethylene.

In the rotary encoder of the above-described preferred embodiment, since the fluororesin filler is polytetrafluoroethylene having a friction coefficient of about 0.04 or less, which is lower than that of other fluororesins, and excellent in heat resistance and chemical stability, slidability of the insulator portion is improved and frictional thermal deformation is reduced.

In a rotary encoder according to a preferred embodiment of the present invention, the base material is an epoxy resin.

In the rotary encoder of the above-described preferred embodiment, by using an epoxy resin for the base material, it is possible to reduce wear powder generated by slidable contact of the slider with the insulator portion. Thus, performance of the rotary encoder is improved, and service life thereof is able to be extended.

In a rotary encoder according to a preferred embodiment of the present invention, one surface side of the insulator portion facing the slider has less spherical silica and more fluororesin filler as compared with another surface side of the insulator portion facing the substrate.

In the rotary encoder of the above-described preferred embodiment, since the one surface side of the insulator portion facing the slider has more fluororesin filler than the other surface side of the insulator portion facing the substrate, wear of the slider is able to be effectively reduced. Further, since the one surface side of the insulator portion facing the slider has less spherical silica as compared with the other surface side facing the substrate, irregularities of one surface are able to be reduced or prevented, and a contact failure in which the slider contacts the insulator portion but does not contact the resistor portion is improved.

Further, in a preferred embodiment of the present invention, the rotary encoder includes a switch mechanism that is pressed by an end portion of the shaft inserted through the encoder mechanism, and the slider is disposed so as to be positioned closer to the switch mechanism than to the insulator portion and the resistor portion.

In the rotary encoder of the above-described preferred embodiment, the slider is disposed to be positioned closer to the switch mechanism than to the insulator portion and the resistor portion, and when the shaft is pressed down, the slider is not pressed against the insulator portion and the resistor portion. Thus, slidability between the slider and the insulator portion and the resistor portion is not impaired by pressing down of the shaft, and therefore, it is possible to effectively achieve reduction of both wear of the insulator portion and wear of the slider.

In a preferred embodiment of the present invention, the encoder mechanism of the rotary encoder is manufactured by a method including a step of preparing an insulating material including a base material made of a resin, spherical silica, and a fluororesin filler; a step of providing an electrode portion on one surface of a substrate so as to extend in a rotation direction of a shaft; a step of applying the prepared insulating material on the electrode portion to form an insulator portion so that the electrode portion is exposed intermittently in a circumferential direction; and a step of applying a resistor material to cover the electrode portion exposed from the insulator portion so as to form the resistor portion.

According to the above-described preferred embodiment, it is possible to manufacture a rotary encoder in which both wear of the insulating substrate and wear of the slider are reduced.

In a preferred embodiment of the present invention, in the step of preparing the insulator portion, a second fluororesin filler having an average particle diameter of about 0.5 μm or more and about 10 μm or less, spherical silica and a base material are kneaded to produce a first fluororesin filler having an average particle diameter of about 50 nm or more and about 800 nm or less by crushing the second fluororesin filler, thereby preparing the insulating material.

According to the above-described preferred embodiment, by kneading and crushing the secondary particles of the fluororesin filler and the spherical silica, the spherical silica having higher hardness serves the role of a grinding medium, and the secondary particles are able to be effectively crushed. In this manner, a fluororesin filler having a small average particle diameter is obtained, and the fluororesin filler is able to be unevenly distributed on one surface side facing the slider, so that wear of the slider can be reduced.

According to preferred embodiments of the present invention, rotary encoder are provided in each of which both wear of the insulator portion and wear of the slider are reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The inventors of preferred embodiments of the present application have considered preventing wear of an insulating substrate by making the insulating substrate from a material having hardness larger than hardness of a slider made of metal. However, by simply improving the hardness of the insulating substrate, the inventors discovered that electrical characteristics change due to wear of the slider, instead of the insulating substrate. As a result of extensive studies of this phenomenon, the inventors of preferred embodiments of the present application have further discovered the addition of spherical silica and a fluororesin filler to a base material in order to improve hardness of an insulator portion and achieve sliding of the insulator portion with respect to the slider. In this manner, it has become possible to reduce wear of the insulator portion while also reducing wear of the slider. Preferred embodiments of the present invention has been made based on the above discoveries which were made independently by the inventors of preferred embodiments of the present invention.

Hereinafter, preferred embodiments of the present invention will be described in more detail with reference to the drawings.

Figure 1:
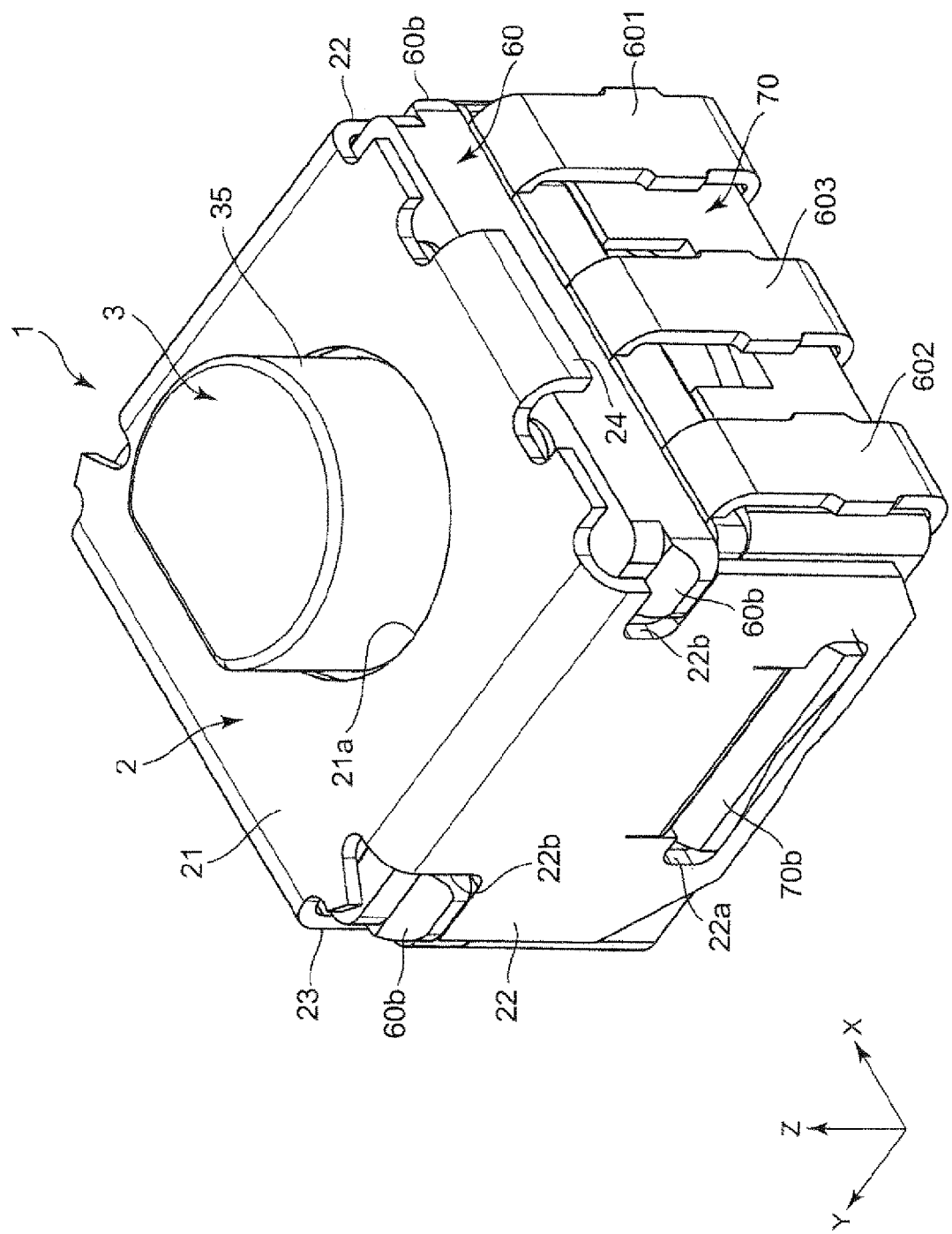
FIG. 1 is a perspective view of a rotary encoder of a preferred embodiment of the present invention, as viewed from above.
Figure 2:
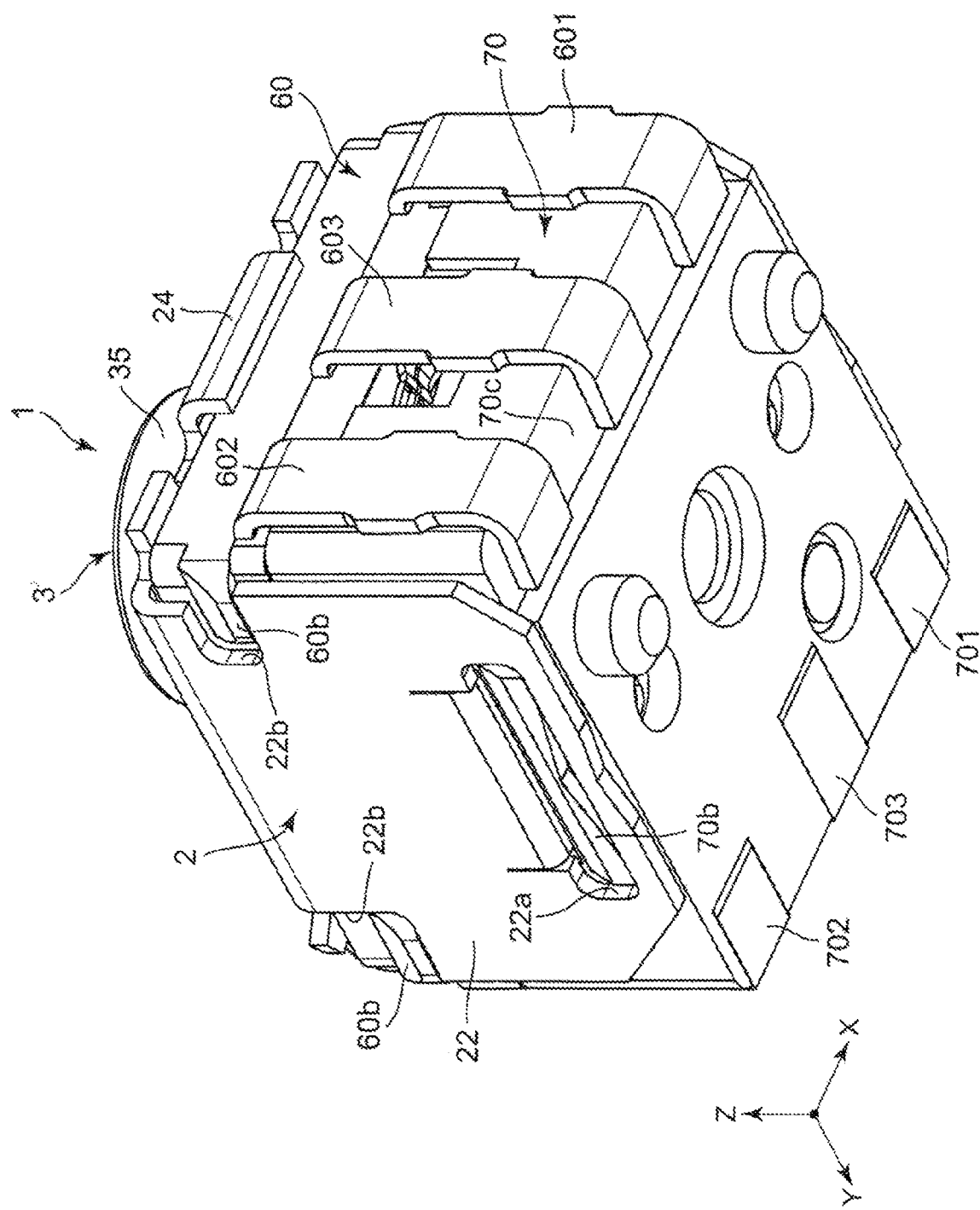
FIG. 2 is a perspective view of the rotary encoder as viewed from below.
Figure 3:
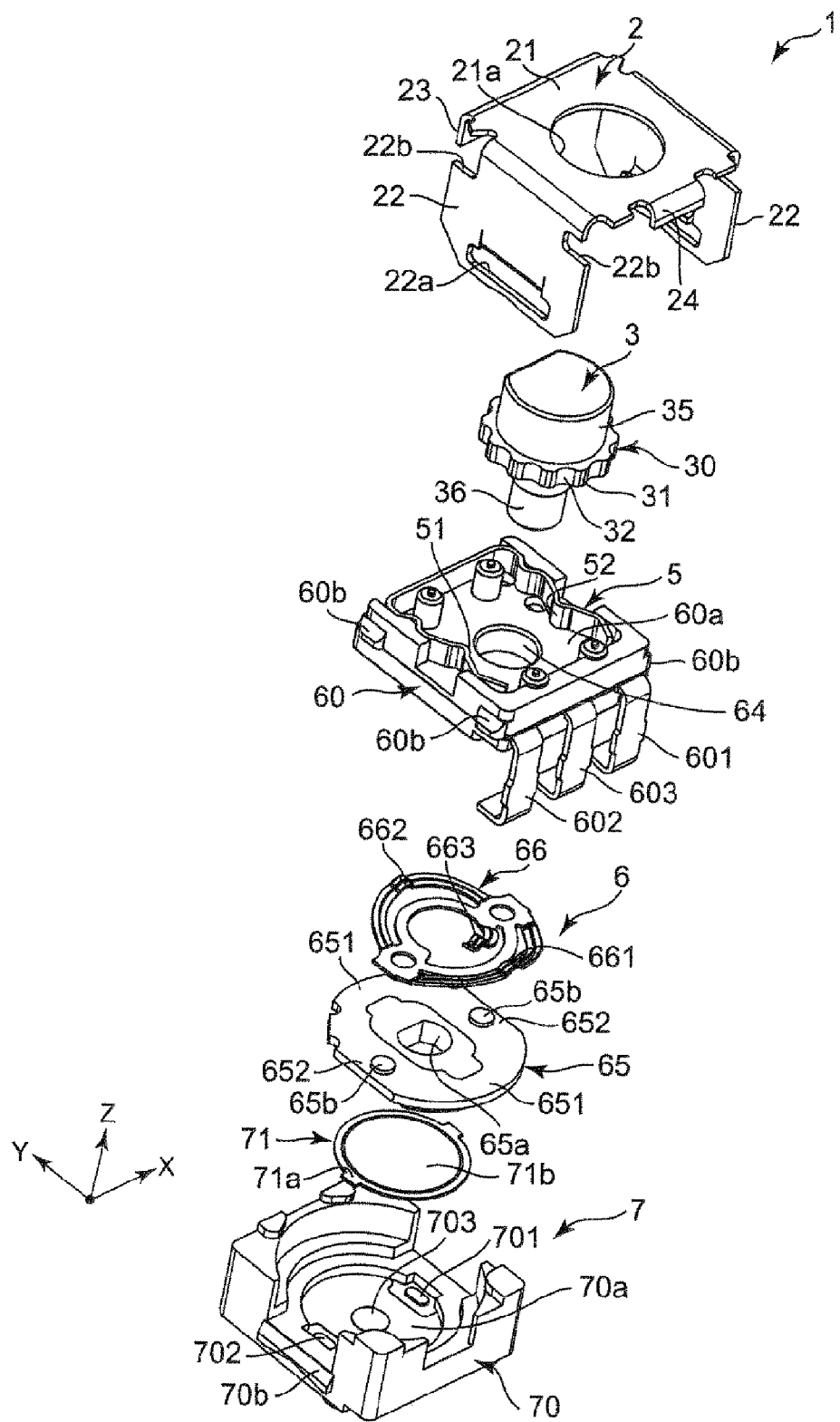
FIG. 3 is an exploded perspective view of the rotary encoder as viewed from above.
Figure 4:
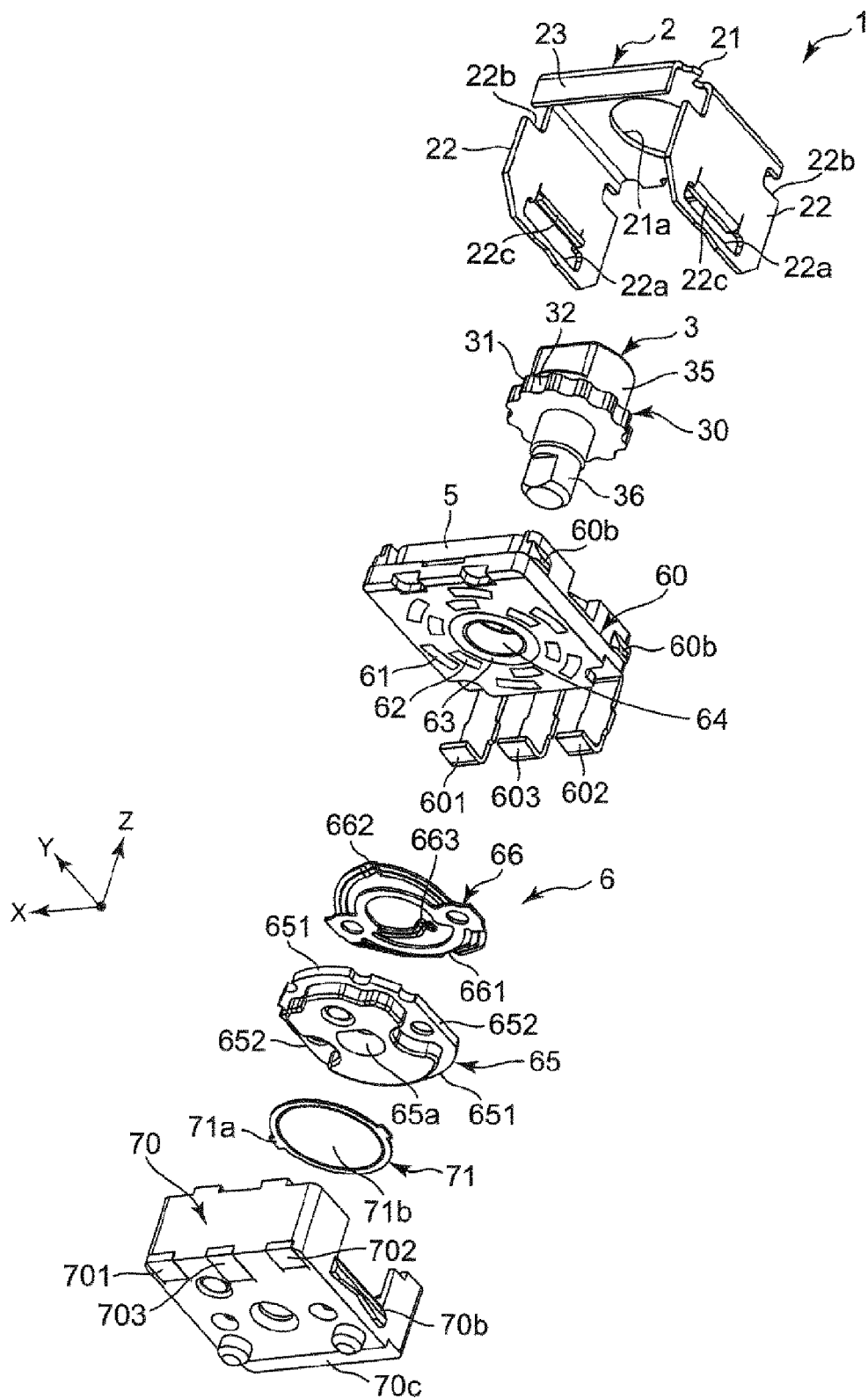
FIG. 4 is an exploded perspective view of the rotary encoder as viewed from below.
Figure 5:
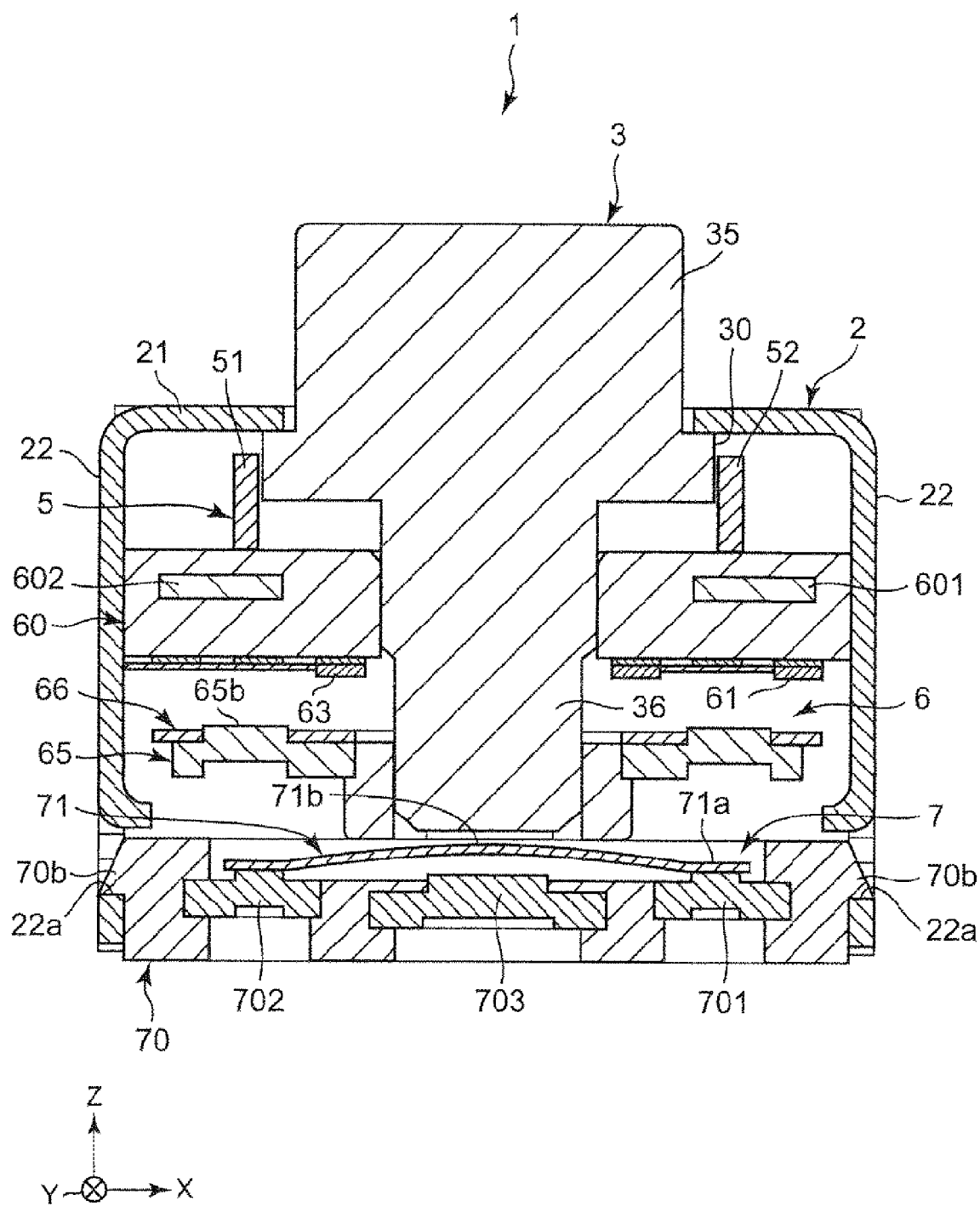
FIG. 5 is a cross-sectional view of the rotary encoder.

FIG. 1 is a perspective view of a rotary encoder according to a preferred embodiment of the present invention, as viewed from above. FIG. 2 is a perspective view of the rotary encoder as viewed from below. FIG. 3 is an exploded perspective view of the rotary encoder as viewed from above. FIG. 4 is an exploded perspective view of the rotary encoder as viewed from below. FIG. 5 is a cross-sectional view of the rotary encoder.

In each of the drawings, a width direction of the rotary encoder is defined as an X direction, a length direction of the rotary encoder is defined as a Y direction, and a height direction of the rotary encoder is defined as a Z direction. A positive direction in the Z direction is defined as an upper side, and a negative direction in the Z direction is defined as a lower side.

As shown in FIG. 1 to FIG. 5, the rotary encoder 1 preferably includes a casing 2, a shaft 3 having a rotation axis and movable along the rotation axis, a regulating member 5 regulating a rotation angle of the shaft 3, an encoder mechanism 6 detecting a rotation direction and a rotation angle of the shaft 3, and a switch mechanism 7 pressed against the shaft 3 by movement along the rotation axis of the shaft 3. The regulating member 5, the encoder mechanism 6, and the switch mechanism 7 are preferably arranged in order from the upper side to the lower side along the axis of the shaft 3.

The casing 2 is preferably made of, for example, a metal. The casing 2 is preferably integrally assembled with the shaft 3, the regulating member 5, the encoder mechanism 6, and the switch mechanism 7.

The casing 2 preferably includes an upper wall 21, side walls 22 provided on both sides in the X direction of the upper wall 21 and extending downward, a projecting wall 23 provided in a positive direction of the Y direction of the upper wall 21 and extending downward, and a projecting piece 24 provided in a negative direction of the Y direction of the upper wall 21 and extending downward. The upper wall 21 includes a hole 21a. Each of the side walls 22 includes a hole 22a on a lower side and grooves 22b on an upper side. On an inner surface of the hole 22a, a locking portion 22c protruding inside the casing 2 is provided. The projecting wall 23 extends across an entire or substantially the entire length of the upper wall 21 in the X direction. The projecting piece 24 is provided at a center portion of the upper wall 21 in the X direction.

The shaft 3 is preferably made of, for example, a resin. The shaft 3 preferably includes an operating portion 35, a gear-shaped outer peripheral surface 30, and an end portion 36. The operating portion 35, the gear-shaped outer peripheral surface 30, and the end portion 36 are arranged in order from the upper side to the lower side along the rotation axis. The operating portion 35 includes a notch defining and functioning as a mark of rotation of the shaft 3. The gear-shaped outer peripheral surface 30 includes a plurality of convex portions 31 and a plurality of concave portions 32. The plurality of convex portions 31 and the plurality of concave portions 32 are alternately arranged in a circumferential direction. The operating portion 35 penetrates the hole 21a of the upper wall 21 of the casing 2, and a user is able to operate the operating portion 35 from the outside of the casing 2.

The regulating member 5 is preferably made of, for example, a metal. The regulating member 5 is preferably, for example, a leaf spring. The regulating member 5 includes a first contact portion 51 and a second contact portion 52 that are able to contact the outer peripheral surface 30 of the shaft 3. The first contact portion 51 and the second contact portion 52 resiliently urge toward and contact a convex portion 31 of the outer peripheral surface 30 of the shaft 3, while being fitted into a concave portion 32 of the outer peripheral surface 30 of the shaft 3 so as to regulate the rotation angle of the shaft 3. The first contact portion 51 and the second contact portion 52 are preferably formed by bending, for example. The first contact portion 51 and the second contact portion 52 are at positions substantially opposed to each other.

The encoder mechanism 6 holds the shaft 3 rotatably and vertically movably in an inserted state so as to detect the rotation direction and the rotation angle of the shaft 3, and includes a substrate 60 with resistor portions 61, 62, 63 and encoder terminals 601, 602, 603 electrically connected to the resistor portions 61, 62, 63, a rotor 65 attached to the shaft 3 so as to be rotatable together with the shaft 3, and a slider 66 attached to the rotor 65 and slidably contacting the resistor portions 61, 62, 63.

The substrate 60 is preferably made of, for example, a resin. In an upper surface of the substrate 60, a recess 60a is provided, and the regulating member 5 is fitted in the recess 60a. Projections 60b are provided on both sides of the substrate 60 in the X direction. The projections 60b are fitted into the grooves 22b of the side walls 22 of the casing 2. Both sides of the substrate 60 in the Y direction are held by the projecting wall 23 and the projecting piece 24. In this manner, the substrate 60 is fixed to the casing 2 by the grooves 22b of the side walls 22, the projecting wall 23, and the projecting piece 24. In other words, the grooves 22b of the side walls 22, the projecting wall 23, and the projecting piece 24 define an encoder fixing portion that fixes the substrate 60. A hole 64 defining and functioning as an insertion hole that holds the shaft 3 in an inserted state is provided at a center portion of the substrate 60.

The resistor portions 61, 62, 63 are provided on a lower surface of the substrate 60. The resistor portions 61, 62, 63 are structured to detect the rotation direction and rotation angle of the shaft 3. The first resistor portions 61, the second resistor portions 62, and the third resistor portion 63 are annularly structured and arranged concentrically. The first resistor portions 61, the second resistor portions 62, and the third resistor portion 63 are arranged in order from a radially outer side to a radially inner side. The first resistor portions and the second resistor portions 62 are provided at discontinuous intervals in the circumferential direction. The third resistor portion 63 is defined by a continuous annulus which encircles the hole 64.

The encoder terminals 601, 602, 603 are preferably at least partially embedded within the substrate 60 by being, for example, insert-molded in the substrate 60. The first encoder terminal 601 is electrically connected to the first resistor portions 61, the second encoder terminal 602 is electrically connected to the second resistor portions 62, and the third encoder terminal 603 is electrically connected to the third resistor portion 63.

The rotor 65 is integrally rotatable with the shaft 3, and may or may not be movable in an axial direction. In the drawings, the rotor 65 is positioned in the circumferential direction with respect to the shaft 3 and is movable in the axial direction (up-down movable). Described more specifically, the rotor 65 preferably includes a D-shaped hole 65a. An outer peripheral surface of an end portion 36 of the shaft 3 has a D shape. The D-shaped end portion 36 is fitted into the D-shaped hole 65a, and the rotor 65 is fixed in the circumferential direction and is not fixed in the axial direction with respect to the shaft 3.

The rotor 65 has an oval or substantially oval shape. The rotor 65 includes a long diameter portion 651 in which an outer diameter of the rotor 65 is a long diameter and a short diameter portion 652 in which an outer diameter of the rotor 65 is a short diameter. A length of the long diameter portion 651 is larger than a gap between the locking portions 22c of the opposing side walls 22, and a length of the short diameter portion 652 is smaller than the gap between the locking portions 22c of the opposing side walls 22. In other words, the locking portions 22c are structured so that the short diameter portion 652 is disengaged without being locked, and the long diameter portion 651 can be engaged and disengaged by rotation of the rotor 65.

The slider 66 is preferably made of, for example, a metal. The slider 66 is preferably fixed to the two projections 65b on an upper surface of the rotor 65. The slider 66 has an annular shape. The slider 66 preferably includes a first contact portion 661, a second contact portion 662, and a third contact portion 663. The first contact portion 661, the second contact portion 662, and the third contact portion 663 are arranged in order from a radially outer side to a radially inner side. The first contact portion 661, the second contact portion 662, and the third contact portion 663 are electrically conductive to each other. The first contact portion 661 is able to contact the first resistor portions 61, the second contact portion 662 is able to contact the second resistor portions 62, and the third contact portion 663 is able to contact the third resistor portion 63.

The switch mechanism 7 preferably includes a switch substrate 70, first to third switch terminals 701, 702, 703 provided on the switch substrate 70, and a conductor 71 provided on the switch substrate 70 and pressed against the end portion 36 of the shaft 3. The conductor 71 is electrically connected to the first and second switch terminals 701, 702. The conductor 71 is pressed by the end portion 36 of the shaft 3 and is electrically connected to the third switch terminal 703 to make the first and second switch terminals 701, 702 and the third switch terminal 703 electrically conductive to each other. When the first and second switch terminals 701, 702 become electrically conductive to the third switch terminal 703, a switch signal turns on. For example, each function operates by turning on of the switch signal. Note that only one of the first and second switch terminals 701, 702 may be provided.

Projections 70b are provided on both sides of the switch substrate 70 in the X direction. The projections 70b are fitted into the holes 22a of the side walls 22 of the casing 2. In this manner, the switch substrate 70 is fixed to the casing 2 by the holes 22a of the side walls 22. In other words, the holes 22a of the side walls 22 define a switch fixing portion that fixes the switch substrate 70.

A step portion 70c is preferably provided on one side of a lower surface of the switch substrate 70 in the X direction. End portions of the bent encoder terminals 601, 602, 603 are engaged with the step portion 70c. That is, the substrate 60 and the switch substrate 70 are integrally held by the bent encoder terminals 601, 602, 603.

A depth of the step portion 70c is deeper than thicknesses of the encoder terminals 601, 602, 603. Thus, when the lower surface of the switch substrate 70 is set on a mounting substrate, not the encoder terminals 601, 602, 603 but the lower surface of the switch substrate 70 may be an installation surface.

The first to third switch terminals 701, 702, 703 are preferably insert-molded in the switch substrate 70. The third switch terminal 703 is located between the first switch terminal 701 and the second switch terminal 702.

The conductor 71 has elasticity. The conductor 71 preferably has a dome shape. The conductor 71 is fitted in a recess 70a in an upper surface of the switch substrate 70.

Peripheral portions 71a of the conductor 71 are electrically connected to the first and second switch terminals 701, 702. While a zenith portion 71b of the conductor 71 is separated from the third switch terminal 703 when the conductor 71 is in a free state, the zenith portion 71b is pressed by the end portion 36 of the shaft 3 penetrating the encoder mechanism 6 so as to be electrically connected to the third switch terminal 703.

That is, when the shaft 3 is pressed downward, the end portion 36 of the shaft 3 presses the zenith portion 71b of the conductor 71, and thus the zenith portion 71b of the conductor 71 is electrically connected to the third switch terminal 703. Consequently, the first and second switch terminals 701, 702 are electrically connected to the third switch terminal 703, and the switch signal turns on.

On the other hand, when the pressing toward a lower side of the shaft 3 is released, the conductor 71 returns to the free state, causing the shaft 3 to move upward, and the zenith portion 71b of the conductor 71 separates from the third switch terminal 703. Consequently, the first and second switch terminals 701, 702 and the third switch terminal 703 are not electrically connected, and the switch signal turns off.

Here, the slider 66 is located closer to the switch mechanism 7 side (lower side) than to the resistor portions 61, 62, 63. Thus, even when the rotor 65 is pulled downward when the shaft 3 is pressed toward the switch mechanism 7 side, the slider 66 receives a force in a direction away from the resistor portions 61, 62, 63. Therefore, the slider 66 is not deformed by being pressed by the resistor portions 61, 62, 63, and reliability of output of the encoder mechanism 6 is able to be maintained. Further, by making the shaft 3 movable in the vertical direction with respect to the rotor 65, even when the shaft 3 is pressed, the position of the rotor 65 is maintained, and the slider 66 and the resistor portions 61, 62, 63 are able to be kept in contact with each other.

Figure 6:
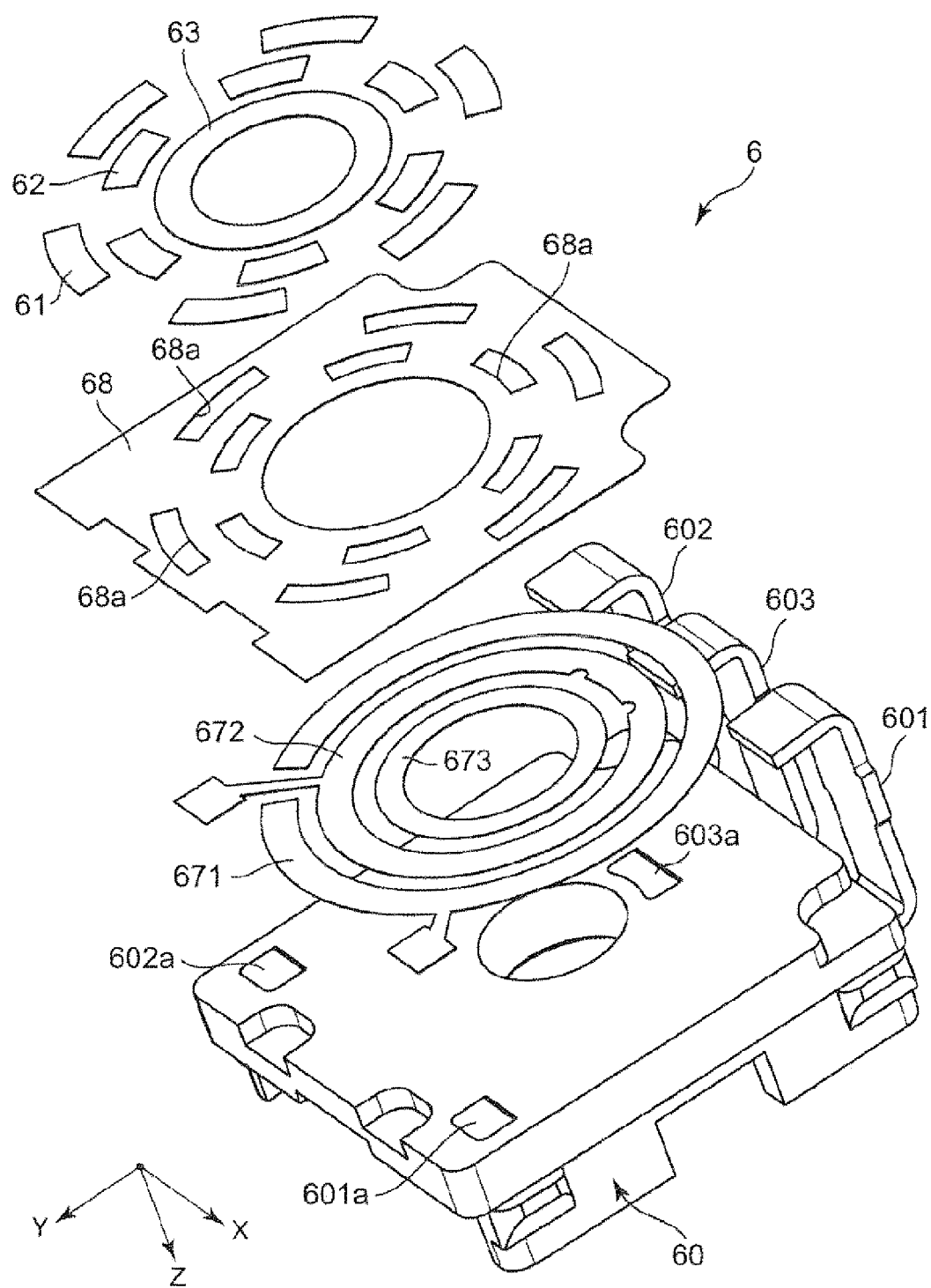
FIG. 6 is an exploded perspective view of an encoder mechanism as viewed from below.

FIG. 6 is an exploded perspective view of the encoder mechanism 6 as viewed from below. As shown in FIG. 6, first, second, and third electrode portions 671, 672, 673 are provided on a lower surface of the substrate 60. The first electrode portion 671, the second electrode portion 672, and the third electrode portion 673 are annularly provided and arranged concentrically. The first electrode portion 671, the second electrode portion 672, and the third electrode portion 673 are arranged in order from the radially outer side to the radially inner side. The first electrode portion 671 is electrically connected to an end portion 601a of the first encoder terminal 601, the second electrode portion 672 is electrically connected to an end portion 602a of the second encoder terminal 602, and the third electrode portion 673 is electrically connected to an end portion 603a of the third encoder terminal 603.

An insulator portion 68 is stacked on the first, second, and third electrode portions 671, 672, 673. The insulator portion 68 covers the first electrode portion 671 and the second electrode portion 672 so that the first electrode portion 671 is intermittently exposed in the circumferential direction and the second electrode portion 672 is intermittently exposed in the circumferential direction. Specifically, the insulator portion 68 includes a plurality of holes 68a intermittently arranged in the circumferential direction, and the first electrode portion 671 and the second electrode portion 672 are exposed through the holes 68a of the insulator portion 68. The third electrode portion 673 is not covered with the insulator portion 68.

The first resistor portions 61 are provided in a portion in which the first electrode portion 671 is exposed through the insulator portion 68, the second resistor portions 62 are provided in a portion in which the second electrode portion 672 is exposed through the insulator portion 68, and the third resistor portion 63 is provided in the third electrode portion 673.

Consequently, the first resistor portions 61 are electrically connected to the first encoder terminal 601 with the first electrode portion 671 interposed therebetween, the second resistor portions 62 are electrically connected to the second encoder terminal 602 with the second electrode portion 672 interposed therebetween, and the third resistor portion 63 is electrically connected to the third encoder terminal 603 with the third electrode portion 673 interposed therebetween.

Figure 7:
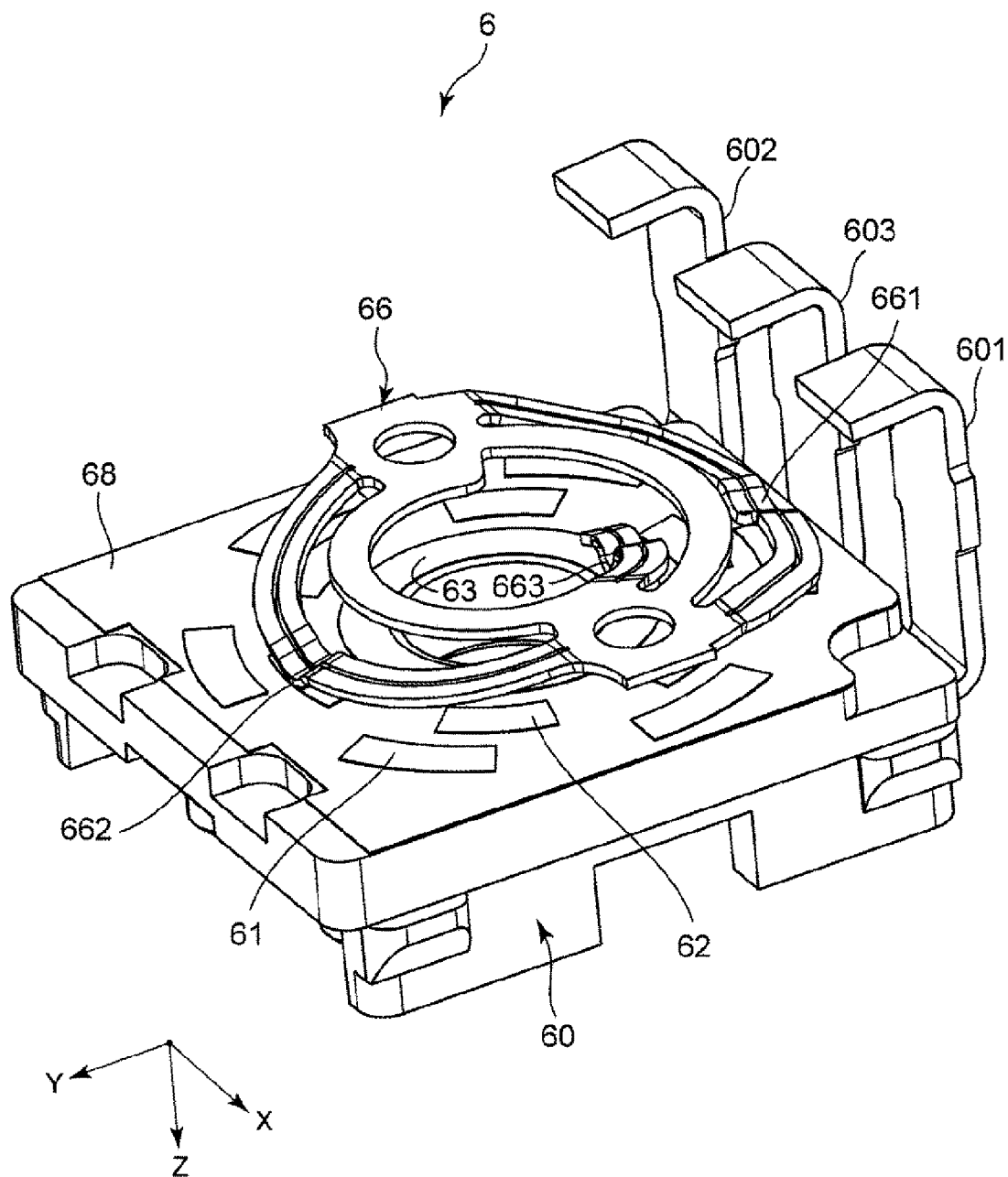
FIG. 7 is a perspective view of the encoder mechanism as viewed from below.

FIG. 7 is a perspective view of the encoder mechanism 6 as viewed from below. As shown in FIG. 7, the first contact portion 661 of the slider 66 is at a position corresponding to the first resistor portions 61, the second contact portion 662 of the slider 66 is at a position corresponding to the second resistor portions 62, and the third contact portion 663 of the slider 66 is at a position corresponding to the third resistor portion 63.

The slider 66 alternately slidably contacts the insulator portion 68 and the resistor portions 61, 62 by rotation of the shaft 3. Specifically, by rotating the shaft 3, the first contact portion 661 of the slider 66 alternately contacts the first resistor portions 61 and the insulator portion 68, and the second contact portion 662 alternately contacts the second resistor portions 62 and the insulator portion 68. The third contact portion 663 always contacts the third resistor portion 63. That is, by rotation of the slider 66, the first encoder terminal 601 and the third encoder terminal 603 are intermittently electrically connected, and the second encoder terminal 602 and the third encoder terminal 603 are intermittently electrically connected.

As shown in FIG. 4, the slider 66 is disposed closer to the switch mechanism 7 than to the insulator portion 68 and the resistor portions 61, 62. Thus, even when the shaft 3 is pressed down, the slider 66 is not pressed against the insulator portion 68 and the resistor portions 61, 62, but slidability between the slider 66 and the insulator portion 68 and the resistor portions 61, 62 cannot be impaired by pressing of the shaft 3. Thus, it is possible to achieve reduction of both wear of the insulator portion 68 and wear of the slider 66.

Figure 8:
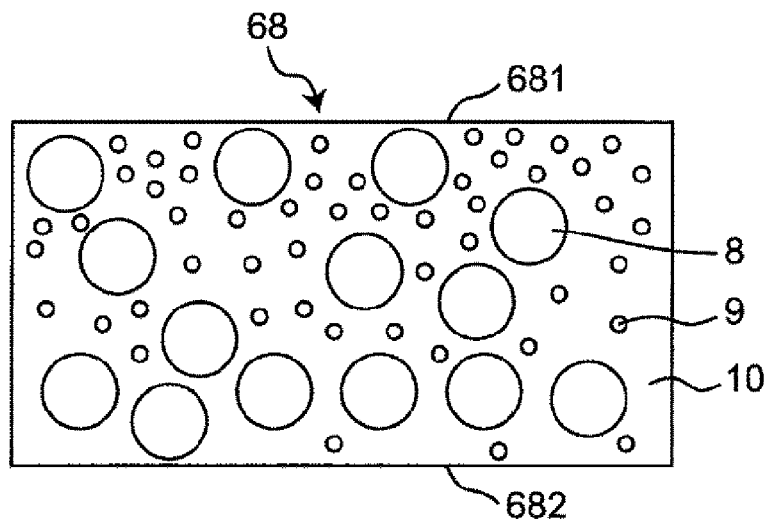
FIG. 8 is a schematic cross-sectional view of an insulator portion.

FIG. 8 is a schematic cross-sectional view of the insulator portion 68. In FIG. 8, characteristics of a state inside the insulator portion 68 are schematically drawn for easy understanding of the characteristics. As shown in FIG. 8, the insulator portion 68 includes a base material 10 preferably made of a resin, spherical silica 8, and a fluororesin filler 9. A plurality of particles of the spherical silica 8 and a plurality of particles of the fluororesin filler 9 exist in the base material 10. The plurality of particles of the spherical silica 8 and the plurality of particles of the fluororesin filler 9 are present between one surface 681 facing the slider of the insulator portion 68 and the other surface 682 facing a substrate of the insulator portion 68.

Hardness of the spherical silica 8 is larger than that of the base material 10 and is equal to or higher than that of metal. Therefore, since the insulator portion 68 includes the spherical silica 8, when the slider 66 slides on the insulator portion 68, due to high hardness of the spherical silica 8 included in the insulator portion 68, wear of the insulator portion 68 is able to be reduced. Specifically, when the contact portions 661, 662 slide on the one surface 681 of the insulator portion 68, it is possible to reduce scratching of the insulator portion 68 by the contact portions 661, 662.

The particle of the spherical silica 8 preferably has a spherical shape including a cornerless cross section, such as, for example, a perfect circle or ellipse. By using such spherical silica 8 having no sharp point, it is possible to reduce irregularities of the one surface 681 of the insulator portion 68, and sliding of the slider 66 is improved. Thus, wear of the slider 66 is able to be reduced. Specifically, when the contact portions 661, 662 slide on the one surface 681 of the insulator portion 68, sliding of the slider 66 improves, and thus wear of the slider 66 by the contact portions 661, 662 is able to be reduced.

The friction coefficient of the fluororesin filler 9 is smaller than that of the spherical silica 8 and the base material 10. Therefore, since the insulator portion 68 includes the fluororesin filler 9, frictional resistance between the slider 66 and the insulator portion 68 is reduced, and thus wear of the slider 66 is able to be reduced. Specifically, when the contact portions 661, 662 slide on one surface 681 of the insulator portion 68 facing the slider, frictional resistance between the contact portions 661, 662 and the insulator portion 68 becomes small, and thus wear of the slider 66 by the contact portions 661, 662 is able to be reduced.

An average particle diameter of the particles of the spherical silica 8 included in the insulator portion 68 is preferably about 0.4 µm or more and about 0.8 µm or less, and more preferably about 0.5 µm or more and about 0.7 µm or less, for example. By setting the average particle diameter of the spherical silica 8 to about 0.8 µm or less, the irregularities of the one surface 681 of the insulator portion 68 are able to be reduced, more specifically, reduced to 10 µm or less (described in Examples). In this manner, contact failure in which the slider 66 contacts the insulator portion 68 but does not contact the resistor portions 61, 62 is improved, and reliability of output of the encoder mechanism 6 is improved. By setting the average particle diameter of the spherical silica 8 to about 0.4 µm or more, moldability of an insulating material including the spherical silica 8 is able to be maintained to such a degree that the insulator portion 68 is able to be molded.

The one surface 681 side of the insulator portion 68 includes less spherical silica 8 and more fluororesin filler 9 than the other surface 682 side of the insulator portion 68. Since the fluororesin filler 9 is included more in the one surface 681 side of the insulator portion 68, the frictional resistance between the slider 66 and the insulator portion 68 becomes small, and thus wear of the slider 66 is able to be reduced. Specifically, the frictional resistance between the contact portions 661, 662 and the insulator portion 68 when the contact portions 661, 662 slide on the one surface 681 of the insulator portion 68 facing the slider becomes small, and thus wear of the slider 66 by the contact portions 661, 662 is able to be reduced.

A content ratio of the spherical silica 8 included in the insulator portion 68 is preferably, for example, about 5 vol % or more and about 50 vol % or less, preferably about 25 vol % or more, and more preferably about 40 vol % or less, a content ratio of the fluororesin filler 9 is preferably, for example, about 1 vol % or more and about 20 vol % or less, and more preferably about 3 vol % or more and about 8 vol % or less, and a sum of the content ratio of the spherical silica 8 and the content ratio of the fluororesin filler 9 is preferably, for example, about 50 vol % or less, and more preferably about 48 vol % or less. In this manner, by skillfully adjusting the content ratios of the spherical silica 8 and the fluororesin filler 9, it is possible to effectively achieve reduction of both wear of the insulator portion 68 and wear of the slider 66. Specifically, it is described in Examples.

The average particle diameter of the fluororesin filler 9 included in the insulator portion 68 is preferably, for example, about 50 nm or more and about 800 nm or less, and more preferably about 50 nm or more and about 300 nm or less. By making the average particle diameter of the fluororesin filler 9 smaller than the average particle diameter of the spherical silica 8 in this manner, it is possible to efficiently achieve an uneven distribution of the fluororesin filler 9 in the one surface 681 side facing the slider according to the Stokes equation as will be described later. Therefore, wear of the slider 66 is able to be effectively reduced.

The fluororesin filler 9 included in the insulator portion 68 is preferably polytetrafluoroethylene, for example, which makes it possible to provide the insulator portion 68 having good slidability and less frictional thermal deformation. In addition, for example, tetrafluoroethylene-perfluoroalkyl vinyl ether copolymer (PFA), polychlorotrifluoroethylene (PCTFE), tetrafluoroethylene-hexafluoropropylene copolymer (FEP), polyvinylidene fluoride (PVDF), tetrafluoroethylene-ethylene copolymer (ETFE), polyvinyl fluoride (PVF), and other suitable materials could also be used, instead of polytetrafluoroethylene.

The base material 10 included in the insulator portion 68 is preferably an epoxy resin, for example. Since the epoxy resin is a material that hardly generates wear powder due to wear, wear powder generated by slidable contact of the slider 66 with the insulator portion 68 is able to be reduced by using the epoxy resin as the base material 10, and it is possible to improve performance of the rotary encoder and extend the service life thereof. Further, for example, thermosetting resins such as urethane resin, polyimide resin, silicone resin, fluorine resin, liquid crystal polymer resin, polyphenylsulfide resin, and thermoplastic resins such as polyethylene, polypropylene, polyvinyl chloride, polystyrene, polyvinyl acetate, acrylic resin, polyester, and other suitable materials could alternatively be used, instead of the epoxy resin.

Figure 9A:
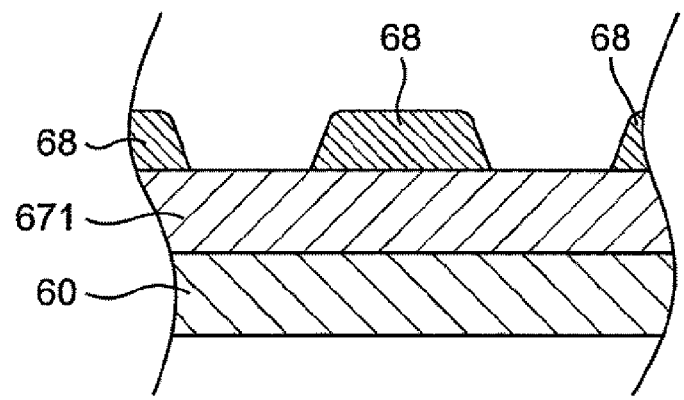
FIG. 9A is an explanatory diagram explaining a preferred embodiment of a manufacturing method of an encoder mechanism.

Next, a non-limiting example of a method of manufacturing the encoder mechanism 6 of the rotary encoder 1 will be described. An insulating material including the base material 10 preferably made of a resin, the spherical silica 8, and the fluororesin filler 9 is prepared. Next, as shown in FIG. 9A, the electrode portions 671, 672 are provided on one surface of the substrate 60 so as to extend in a rotation direction of the shaft 3, and the prepared insulating material is applied on the electrode portions 671, 672 so that the electrode portions are exposed intermittently in a circumferential direction, so as to form the insulator portion. Specifically, the insulating material is applied by screen printing using a mask, and the insulating material applied is cured to form the insulator portion 68.

Figure 9B:
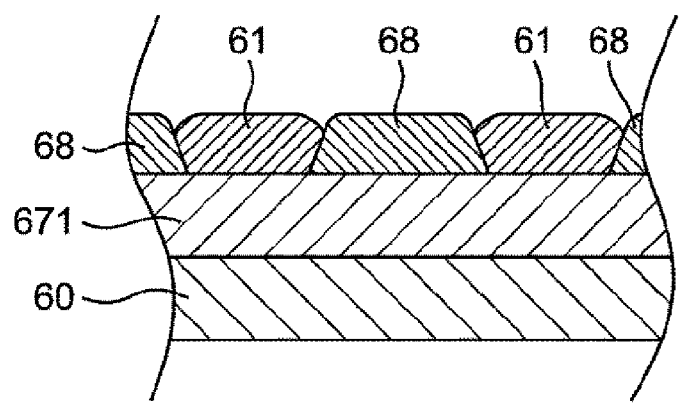
FIG. 9B is an explanatory diagram explaining the manufacturing method of the encoder mechanism.

Thereafter, as shown in FIG. 9B, a resistor material is applied onto the electrode portions 671, 672 exposed from the insulator portion 68, to form the resistor portions 61, 62. Specifically, the resistor material is applied by screen printing using a mask, and the resistor material applied is cured to form the resistor portions 61, 62. By manufacturing in this manner, it is possible to manufacture a rotary encoder in which both wear of the insulating substrate and wear of the slider are reduced.

In the step of preparing the insulating material, preferably, a second fluororesin filler 9 (hereinafter referred to as a secondary-particle fluororesin filler 9), the spherical silica 8, and the base material 10 are kneaded, so as to produce a first fluororesin filler 9 (hereinafter referred to as a primary-particle fluororesin filler 9) by crushing the secondary-particle fluororesin filler 9. An average particle diameter of the secondary-particle fluororesin filler 9 to be used is preferably, for example, about 0.5 µm or more and about 10 µm or less, and more preferably about 2 µm or more and about 8 µm or less. An average particle diameter of the crushed primary-particle fluororesin filler 9 is preferably, for example, about 50 nm or more and about 800 nm or less, and more preferably about 50 nm or more and about 300 nm or less.

By adjusting the insulating material in this manner, out of the secondary particles of the kneaded fluororesin filler 9 and the spherical silica 8, the spherical silica 8 having higher hardness serves the role of a grinding medium, and the secondary particles are able to be effectively crushed. In this manner, an insulating material including the fluororesin filler 9 having a small average particle diameter is able to be obtained. When the obtained insulating material is applied on the electrode portions 671, 672, the spherical silica 8 having a large particle diameter is precipitated at a higher rate as compared with the fluororesin filler 9 having a smaller particle diameter in accordance with the Stokes equation, thus achieving a structure having more fluororesin filler 9 on one surface side of the applied insulating material (one surface 681 of the insulator portion 68) facing the slider as compared with the other surface side of the insulating material (the other surface 682 of the insulator portion 68) facing the substrate 60. Further, by curing the insulating material, the insulator portion 68 including a large amount of the fluororesin filler 9 on the one surface 681 side facing the slider is obtained, and thus wear of the slider is able to be effectively reduced.

Figure 10:
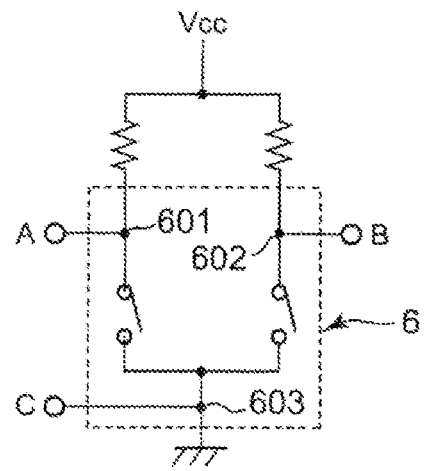
FIG. 10 is a circuit diagram showing an equivalent circuit of an encoder mechanism.
Figure 11:
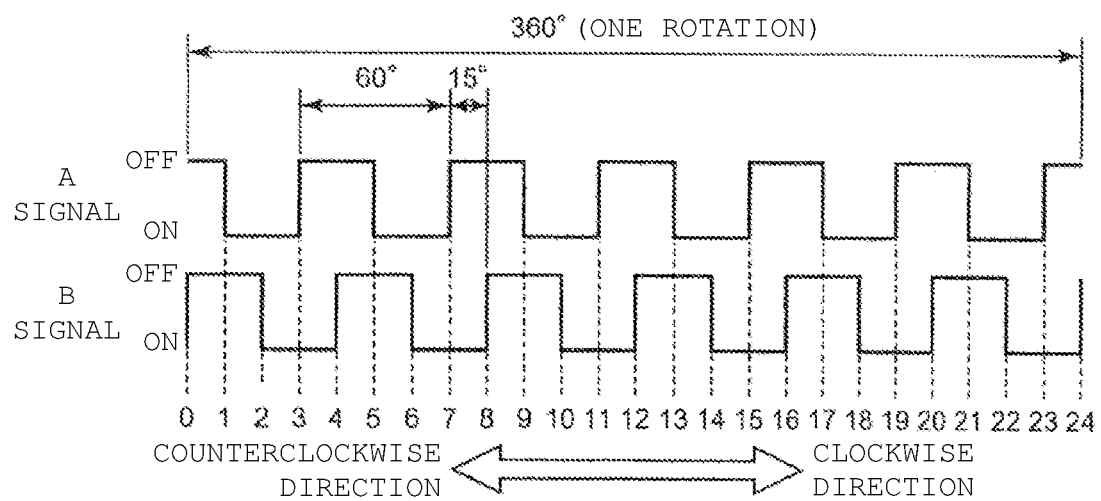
FIG. 11 is a waveform diagram showing an output waveform of the encoder mechanism.

FIG. 10 is a circuit diagram showing an equivalent circuit of the encoder mechanism 6. FIG. 11 is a waveform diagram showing an output waveform of the encoder mechanism 6. As shown in FIGS. 10 and 11, when the first encoder terminal 601 and the third encoder terminal 603 are electrically connected, a current flows between a point A and a point C, and an A signal turns on. When the second encoder terminal 602 and the third encoder terminal 603 are electrically connected, a current flows between a point B and a point C, and a B signal turns on.

In a clockwise rotation of the slider 66, a rotation angle of the slider 66 from a start of turning off of the A signal to a start of the next turning off is preferably 60°, for example. The same applies to the B signal. Further, a shift between the start of turning off of the A signal and the start of turning off of the B signal is preferably 15°, for example in the rotation angle of the slider 66. In one rotation of the slider 66 (that is, the rotation angle of the slider 66 is 360°), a change in combination of turning on and turning off of the A signal and the B signal is preferably divided into 24. In other words, it may be determined that the rotation angle of the slider 66 changes every 15 degrees in one rotation of the slider 66. Therefore, by judging changes of the A signal and the B signal, it is possible to determine the rotation direction and the rotation angle (rotation amount) of the slider 66.

Figure 12:
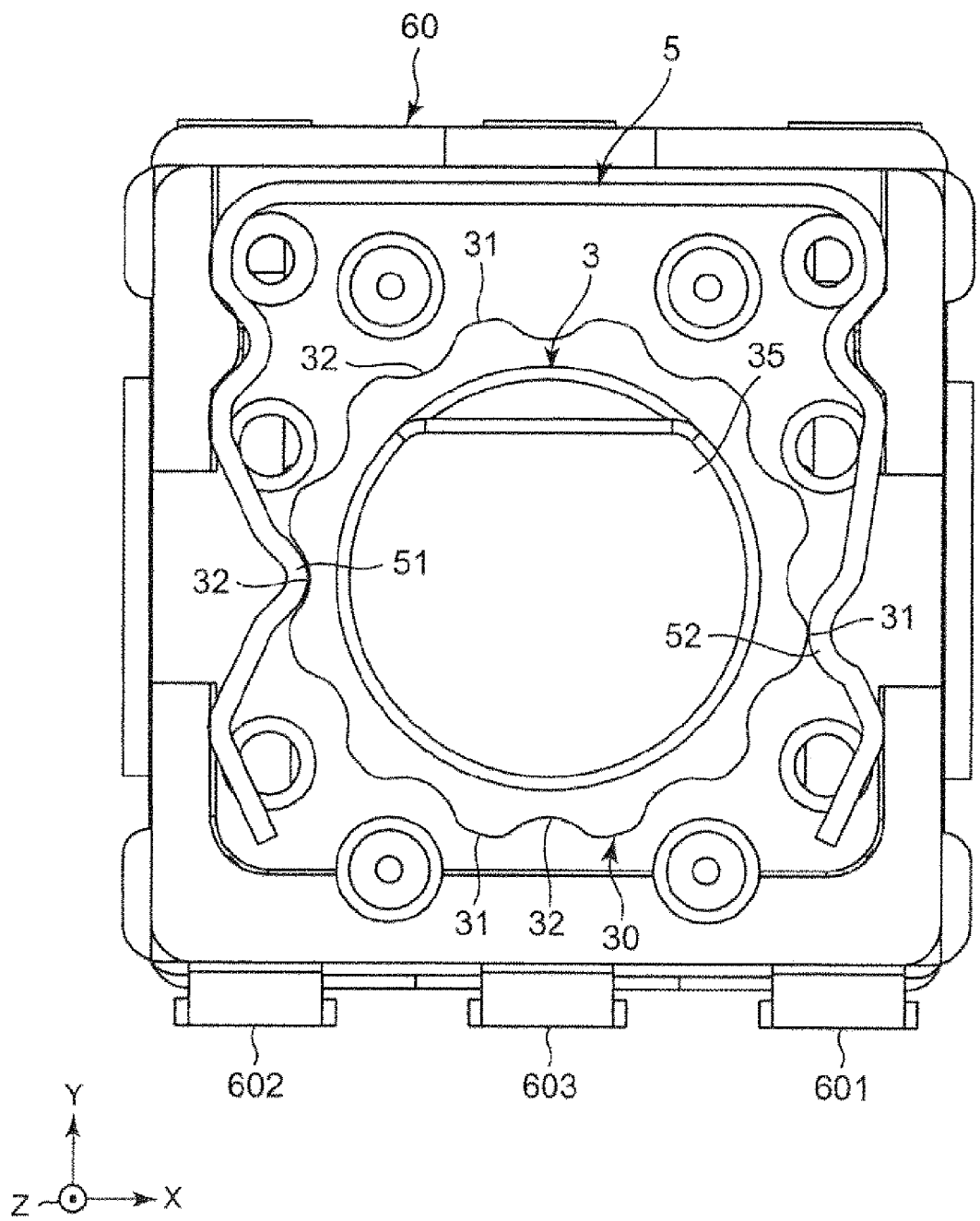
FIG. 12 is a plan view showing a relationship between a shaft and a regulating member according to a preferred embodiment of the present invention.

Note that, as will be described below, by shifting a waveform of torque of the first contact portion 51 and a waveform of torque of the second contact portion 52, it is possible to increase the total number of clicks. FIG. 12 is a plan view showing a relationship between the shaft 3 and the regulating member 5. As shown in FIG. 12, when the first contact portion 51 of the regulating member 5 is in contact with the convex portion 31 of the outer peripheral surface 30 of the shaft 3, the second contact portion 52 of the regulating member 5 fits into the concave portion 32 of the outer peripheral surface 30 of the shaft 3. On the other hand, when the first contact portion 51 of the regulating member 5 is fitted into the concave portion 32 of the outer peripheral surface 30 of the shaft 3, the second contact portion 52 of the regulating member 5 contacts the convex portion 31 of the outer peripheral surface 30 of the shaft 3. That is, a phase difference of the rotation angle of the shaft 3 is provided between a contact between the first contact portion 51 and the convex portion 31 and a contact between the second contact portion 52 and the convex portion 31. When the shaft 3 rotates, the first contact portion 51 and the second contact portion 52 alternately fit into the concave portion 32 of the outer peripheral surface 30 of the shaft 3.

Figure 13A:
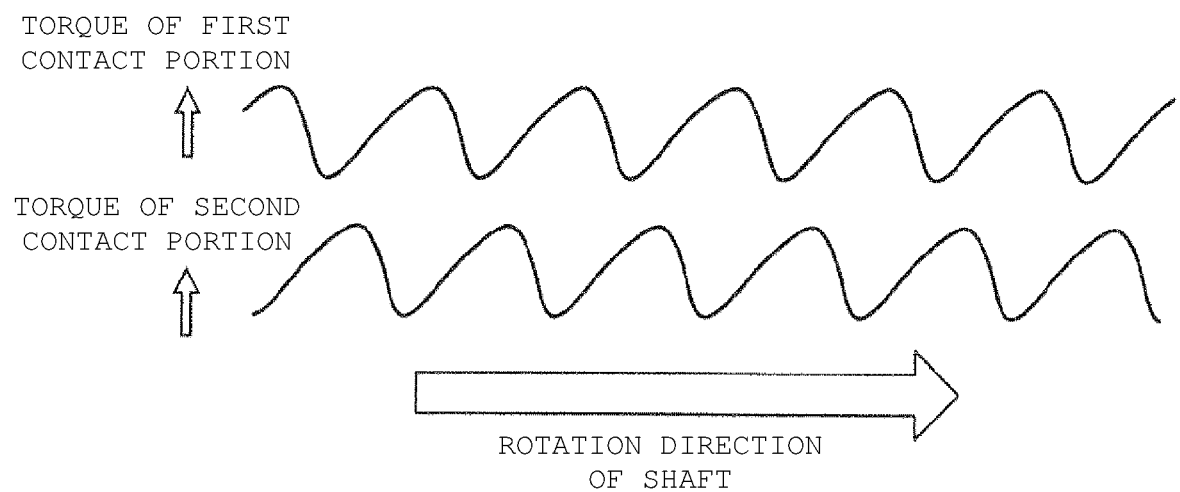
FIG. 13A is a graph showing changes in torque of a first contact portion and a second contact portion of the regulating member when the shaft rotates.

FIG. 13A is a graph showing changes in torque of the first contact portion 51 and the second contact portion 52 when the shaft 3 rotates. As shown in FIG. 13A, as the shaft 3 rotates, torque of each of the first contact portion 51 and the second contact portion 52 has a waveform that repeats a maximum and a minimum. For example, when the convex portion 31 of the outer peripheral surface 30 of the shaft 3 passes against elastic force of the first contact portion 51 by rotation of the shaft 3, the torque becomes maximum. When the torque reaches from the maximum to the minimum, a user obtains a click feeling. The torque of the first contact portion 51 and the torque of the second contact portion 52 are alternately maximized.

Figure 13B:
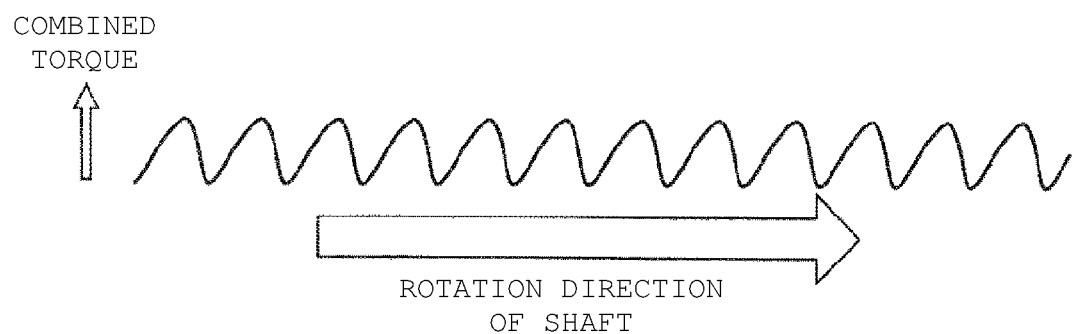
FIG. 13B is a graph showing changes in torque obtained by combining torque of the first contact portion of the regulating member and torque of the second contact portion of the regulating member.

FIG. 13B is a graph showing changes in torque obtained by combining the torque of the first contact portion 51 and the torque of the second contact portion 52. As shown in FIG. 13B, the wavelength of a combined torque waveform is twice the wavelength of each torque waveform of the first contact portion 51 and the second contact portion 52. That is, in one rotation of the shaft 3, a quantity (the number of clicks) by which the combined torque becomes the maximum is a quantity (the number of clicks) resulted from adding a quantity (the number of clicks) by which the torque of the first contact portion 51 becomes maximum and a quantity (the number of clicks) by which the torque of the second contact portion 52 becomes maximum.

Therefore, by shifting the waveform of torque of the first contact portion 51 and the waveform of torque of the second contact portion 52, the total number of clicks is double the number of clicks of each of the first contact portion 51 and the second contact portion 52. Therefore, even if the shaft 3 is reduced in size, the number of clicks is able to be increased.

Example 1

A test was conducted to evaluate wear resistance of the insulator portion and the slider when the rotary encoder described in the above preferred embodiment was used.

The evaluation method of the wear resistance of the insulator portion is as follows. As shown in Table 1, the type of the insulator portion 68 was changed, and 300,000 rotations were performed while the slider 66 alternately slidably contacts the surface of the insulator portion 68 and the surface of the first resistor portion 61. At this time, due to repeated sliding of the slider 66, a wear mark was generated on the one surface 681 of the insulator portion 68. Five points were arbitrarily chosen from the region of the generated wear mark, a depth (μm) from a region where no wear mark is generated on one surface 681 of the insulator portion 68 was measured for each point, and an average value of five depths was taken as an insulator portion wear amount of the rotary encoder 1.

Figure 14:
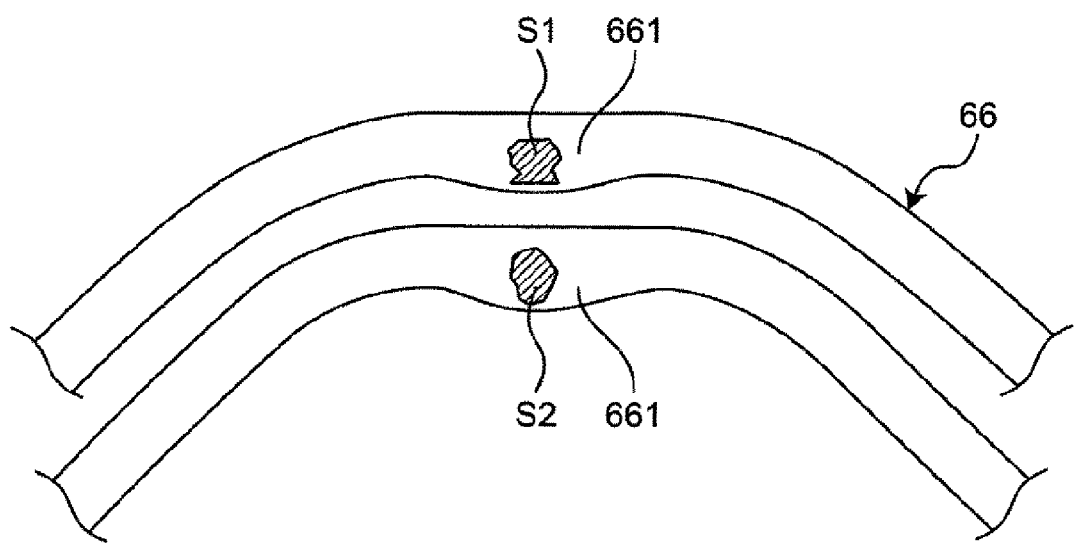
FIG. 14 is a plan view showing a contact portion of the slider after being used in the rotary encoder.

From the above test, as shown in FIG. 14, two projecting portions of the contact portions 661, 662 of the slider 66 were worn out by alternate slidable contact with the first resistor portion 61 and the insulator portion 68, thus forming wear planes S1, S2. The wear planes S1, S2 of the contact portions 661, 662 of the slider 66 are indicated by hatched portions in FIG. 14. Areas of the wear planes S1, S2 thus formed were measured and an average value of the two areas was taken as a slider wear area of the rotary encoder 1.

The average particle diameters of the spherical silica 8 used for the insulator portion 68 were all about 0.6 μm. The average particle diameter was determined from particle diameters measured by laser diffraction method (Microtrac made by HORIBA, Ltd.) after ultrasonic dispersion of particles in sodium hexametaphosphate aqueous solution.

TABLE 1

|  | Content ratio of silica | Content ratio of filler | Insulator part wear amount μm | Slider wear area μm$^2$ |
| --- | --- | --- | --- | --- |
| Comparative example 1-1 | Hydrated silica 2 vol % | Talc 2 vol % | 10.31 | 11653 |
| Comparative example 1-2 | Spherical silica 5 vol % | None | 10.20 | 11000 |
| Comparative example 1-3 | Spherical silica 10 vol % | None | 10.00 | 12000 |
| Comparative example 1-4 | Spherical silica 20 vol % | None | 8.31 | 17939 |
| Comparative example 1-5 | Spherical silica 30 vol % | None | 8.78 | 19426 |
| Comparative example 1-6 | Spherical silica 40 vol % | None | 6.91 | 22043 |
| Comparative example 1-7 | Spherical silica 50 vol % | None | 5.90 | 25010 |
| Example 1-1 | Spherical silica 9 vol % | PTFE 6 vol % | 8.54 | 4839 |
| Example 1-2 | Spherical silica 17 vol % | PTFE 6 vol % | 8.31 | 8238 |

TABLE 1-continued

|  | Content ratio of silica | Content ratio of filler | Insulator part wear amount μm | Slider wear area μm² |
|---|---|---|---|---|
| Example 1-3 | Spherical silica 28 vol % | PTFE 6 vol % | 6.51 | 6020 |
| Example 1-4 | Spherical silica 36 vol % | PTFE 6 vol % | 3.41 | 5648 |
| Example 1-5 | Spherical silica 30 vol % | PTFE 1 vol % | 7.25 | 9500 |
| Example 1-6 | Spherical silica 30 vol % | PTFE 10 vol % | 5.65 | 8898 |
| Example 1-7 | Spherical silica 30 vol % | PTFE 20 vol % | 4.05 | 7300 |
| Comparative example 1-8 | Spherical silica 30 vol % | MoS2 10 vol % | 9.27 | 18860 |
| Comparative example 1-9 | None | CaCO3 40 vol % | 18.00 | 23913 |

As shown in Table 1, by changing the silica used for the insulator portion 68 from hydrated silica (Comparative Example 1) to the spherical silica 8 (Comparative Example 2), the insulator portion wear amount and the slider wear area were both reduced. It is conceivable that this reduction in slider wear area was achieved because sliding of the slider 66 was improved by using the spherical silica 8 having no sharp point. As can be seen from Comparative Examples 2 to 7, the insulator portion wear amount was smaller as the content of the spherical silica 8 was larger. However, in Comparative Examples 2 to 7, as the content of the spherical silica 8 increased, the insulator portion wear amount decreased, and at the same time, the slider wear area increased. On the other hand, in the insulator portion 68 (Examples 1 to 7) including the spherical silica 8 and polytetrafluoroethylene (PTFE) which is the fluororesin filler 9, as compared with the insulator portion 68 including no spherical silica 8 (Comparative Example 1), both the insulator portion wear amount and the slider wear area are significantly reduced, and particularly the slider wear area is reduced to about 10,000 μm² or less in any case. In Comparative Example 8 in which molybdenum disulfide MoS₂ was used instead of PTFE which is the fluororesin filler 9, by the insulator portion 68 including the spherical silica 8, as compared with the insulator portion 68 including no spherical silica 8 (Comparative Example 1), the insulator portion wear amount was reduced, but the slider wear area significantly exceeded 10,000 μm². In Comparative Example 9 in which the insulating material does not contain the spherical silica 8 and contains only calcium carbonate (CaCO₃), as compared with other examples and comparative examples using silica, the insulator portion wear amount was larger, and the slider wear area exceeded 20,000 μm².

With respect to the silica content ratio and the filler content ratio expressed in volume % described in the examples, in the actual process, using the specific weight (weight per volume) of each of the silica, the filler, and the base material, volume % of each desired material was converted into weight %, and each material was weighed based on the converted weight % of each material to prepare an insulating material.

Example 2

Next, a test was conducted to investigate a relationship between the average particle diameter of the spherical silica 8 to be used and the surface irregularities of the insulator portion 68.

The test method is as follows. The insulating material is prepared by kneading the spherical silica 8, PTFE of secondary particles, and the base material 10 in a manner that PTFE of secondary particles is crushed. In the prepared insulating material, PTFE is crushed to primary particles. Using the prepared insulating material, the rotary encoder 1 described in the preferred embodiment was made, and the irregularities of the one surface 681 facing the slider of the insulator portion 68 of the made rotary encoder 1 was measured. Here, maximum roughness Rz of a natural surface of the insulator portion 68 after curing measured with a laser microscope made by Keyence Corporation was taken as irregularities (corresponding to surface irregularities in Table 2) of the one surface 681 facing the slider. Subsequently, a test for measuring the insulator portion wear amount and the slider wear area was performed on the made rotary encoder 1 in the same manner as in Example 1.

TABLE 2

|  | Content ratio of silica | Average particle diameter of silica | Content ratio of filler$_{None}$ | Average particle diameter of primary-particle filler | Average particle diameter of secondary-particle filler | Surface irregularities μm | Insulator part wear amount μm | Slider wear area μm² |
|---|---|---|---|---|---|---|---|---|
| Comparative example 2-1 | Hydrated silica 2 vol % | 0.1 | None | — | — | — | 10.31 | 11653 |
| Example 2-1 | Spherical silica 30 vol % | 0.4 | PTFE 10 vol % | 50 nm | 0.5 μm | 3.40 | 5.25 | 8650 |
| Example 2-2 | Spherical silica 30 vol % | 0.6 | PTFE 10 vol % | 150 nm | 5 μm | 3.50 | 5.65 | 8898 |

TABLE 2-continued

|  | Content ratio of silica | Average particle diameter of silica | Content ratio of filler$_{None}$ | Average particle diameter of primary-particle filler | Average particle diameter of secondary-particle filler | Surface irregularities μm | Insulator part wear amount μm | Slider wear area μm² |
|---|---|---|---|---|---|---|---|---|
| Example 2-3 | Spherical silica 30 vol % | 0.8 | PTFE 10 vol % | 800 nm | 10 μm | 3.25 | 5.13 | 8350 |
| Comparative example 2-2 | Spherical silica 30 vol % | 3 | PTFE 10 vol % | 150 nm | 5 μm | 13.00 | 6.95 | 9250 |
| Comparative example 2-3 | Spherical silica 30 vol % | 7 | PTFE 10 vol % | 150 nm | 5 μm | 18.00 | 5.45 | 10055 |

As shown in Table 2, by setting the average particle diameter of the spherical silica 8 to about 0.4 μm or more and about 0.8 μm or less, the surface irregularities of the insulator portion 68 were reduced within about 10 μm (Examples 1 to 3). Here, it is conceivable that because PTFE of secondary particles was sufficiently crushed during the kneading with the spherical silica 8 and the base material 10 and existed as primary particles having an average particle diameter of less than about 1 μm in the insulating material, the surface irregularities of the insulator portion 68 were reduced within about 10 μm. Further, increasing and decreasing the average particle diameter of the spherical silica 8 within the range of about 0.4 μm or more and about 0.8 μm or less did not cause a significant increase and decrease in the insulator portion wear amount and the slider wear area (Examples 1 to 3). In Comparative Examples 2 and 3 in which the average particle diameters of the spherical silica 8 were set to about 3 μm and about 7 μm, the average particle diameters of the spherical silica 8 were too large and hence the surface irregularities exceeded 10 μm, and the slider wear area increased as compared with Examples 1 to 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary encoder comprising:
a shaft; and
an encoder mechanism that holds the shaft in a rotatably inserted state and detects a rotation direction and a rotation angle of the shaft; wherein
the encoder mechanism includes:
    a substrate that rotatably holds the shaft;
    an insulator portion and resistor portions provided on one surface of the substrate and alternately provided in the rotation direction of the shaft;
    a rotor attached to the shaft so as to be integrally rotatable with the shaft; and
    a slider that is attached to the rotor and alternately contacts the insulator portion and the resistor portions in a sliding manner by rotation of the shaft;
the insulator portion includes a base material made of a resin, spherical silica, and a fluororesin filler; and
an average particle diameter of the spherical silica is about 0.4 μm or more and about 0.8 μm or less.

2. The rotary encoder according to claim 1, wherein a content ratio of the spherical silica included in the insulator portion is about 5 vol % or more and about 50 vol % or less, a content ratio of the fluororesin filler included in the insulator portion is about 1 vol % or more and about 20 vol % or less, and a sum of the content ratio of the spherical silica and the content ratio of the fluororesin filler is 50 vol % or less.

3. The rotary encoder according to claim 1, wherein an average particle diameter of the fluororesin filler is about 50 nm or more and about 800 nm or less.

4. The rotary encoder according to claim 1, wherein the fluororesin filler is polytetrafluoroethylene.

5. The rotary encoder according to claim 1, wherein the base material is an epoxy resin.

6. The rotary encoder according to claim 1, wherein one surface side of the insulator portion facing the slider has less spherical silica and more fluororesin filler as compared with another surface side of the insulator portion facing the substrate.

7. The rotary encoder according to claim 1, further comprising a switch mechanism that is pressed by an end portion of the shaft inserted through the encoder mechanism, and the slider is disposed so as to be positioned closer to the switch mechanism than to the insulator portion and the resistor portions.

8. The rotary encoder according to claim 1, further comprising:
    a regulating member fitted in a recess provided in the substrate; wherein
    the regulating member engages an outer peripheral surface of the shaft.

9. The rotary encoder according to claim 8, wherein
    the outer peripheral surface of the shaft includes a plurality of convex portions and a plurality of concave portions alternately arranged in a circumferential direction about the shaft; and
    the regulating member includes a leaf spring which engages with the plurality of convex portions and the plurality of concave portions when the shaft is rotated.

10. The rotary encoder according to claim 1, wherein
    a hole is provided in the substrate; and
    the shaft is inserted through the hole of the substrate.

11. The rotary encoder according to claim 10, wherein
    the resistor portions are annularly structured and arranged concentrically; and
    the resistor portions are provided on the one surface of the substrate with the resistor portions extending around the hole in a circumferential direction.

12. The rotary encoder according to claim 11, wherein the resistor portions include at least one resistor portion provided at discontinuous intervals in the circumferential direction and one resistor portion defined by a continuous annulus which encircles the hole.

13. The rotary encoder according to claim 1, further comprising:
encoder terminals electrically connected to respective ones of the resistor portions; wherein
the encoder terminals are at least partially embedded within the substrate.

14. The rotary encoder according to claim 1, wherein the slider is fixed to projections defined in an upper surface of the rotor.

15. The rotary encoder according to claim 1, further comprising electrode portions defined on the one surface of the substrate and partially covered by the insulator portion.

16. The rotary encoder according to claim 15, wherein the resistor portions contact exposed portions of respective ones of the electrode portions through openings in the insulator portion.

17. The rotary encoder according to claim 16, further comprising encoder terminals electrically connected to respective ones of the resistor portions through the electrode portions.

18. A method of manufacturing an encoder mechanism of a rotary encoder,
the rotary encoder including:
a shaft; and
the encoder mechanism that holds the shaft in a rotatably inserted state and detects a rotation direction and a rotation angle of the shaft; wherein
the encoder mechanism includes:
a substrate that rotatably holds the shaft;
an insulator portion and resistor portions provided on one surface of the substrate and alternately provided in the rotation direction of the shaft;
a rotor attached to the shaft so as to be integrally rotatable with the shaft; and
a slider that is attached to the rotor and alternately contacts the insulator portion and the resistor portions in a sliding manner by rotation of the shaft; and
the insulator portion includes a base material made of a resin, spherical silica, and
a fluororesin filler; and
the method comprising:
a step of preparing an insulating material including the base material made of a resin, spherical silica, and a fluororesin filler;
a step of providing an electrode portion on one surface of the substrate so as to extend in a rotation direction of the shaft;
a step of applying the insulating material on the electrode portion to form the insulator portion so that the electrode portion is exposed intermittently in a circumferential direction; and
a step of applying a resistor material on the electrode portion exposed from the insulator portion to form the resistor portions; wherein
in the step of preparing the insulating material, a second fluororesin filler having an average particle diameter of about 0.5 μm or more and about 10 μm or less, the spherical silica, and the base material are kneaded to produce a first fluororesin filler having an average particle diameter of about 50 nm or more and about 800 nm or less by crushing the second fluororesin filler.

19. A rotary encoder comprising:
a shaft; and
an encoder mechanism that holds the shaft in a rotatably inserted state and detects a rotation direction and a rotation angle of the shaft; wherein
the encoder mechanism includes:
a substrate that rotatably holds the shaft;
an insulator portion and resistor portions provided on one surface of the substrate and alternately provided in the rotation direction of the shaft;
a rotor attached to the shaft so as to be integrally rotatable with the shaft; and
a slider that is attached to the rotor and alternately contacts the insulator portion and the resistor portions in a sliding manner by rotation of the shaft;
the insulator portion includes a base material made of a resin, spherical silica, and a fluororesin filler; and
the base material is an epoxy resin.

* * * * *